No. 882,872. PATENTED MAR. 24, 1908.
R. N. CHAMBERLAIN.
SYSTEM OF ELECTRICAL DISTRIBUTION.
APPLICATION FILED JAN. 17, 1906.
2 SHEETS—SHEET 1.
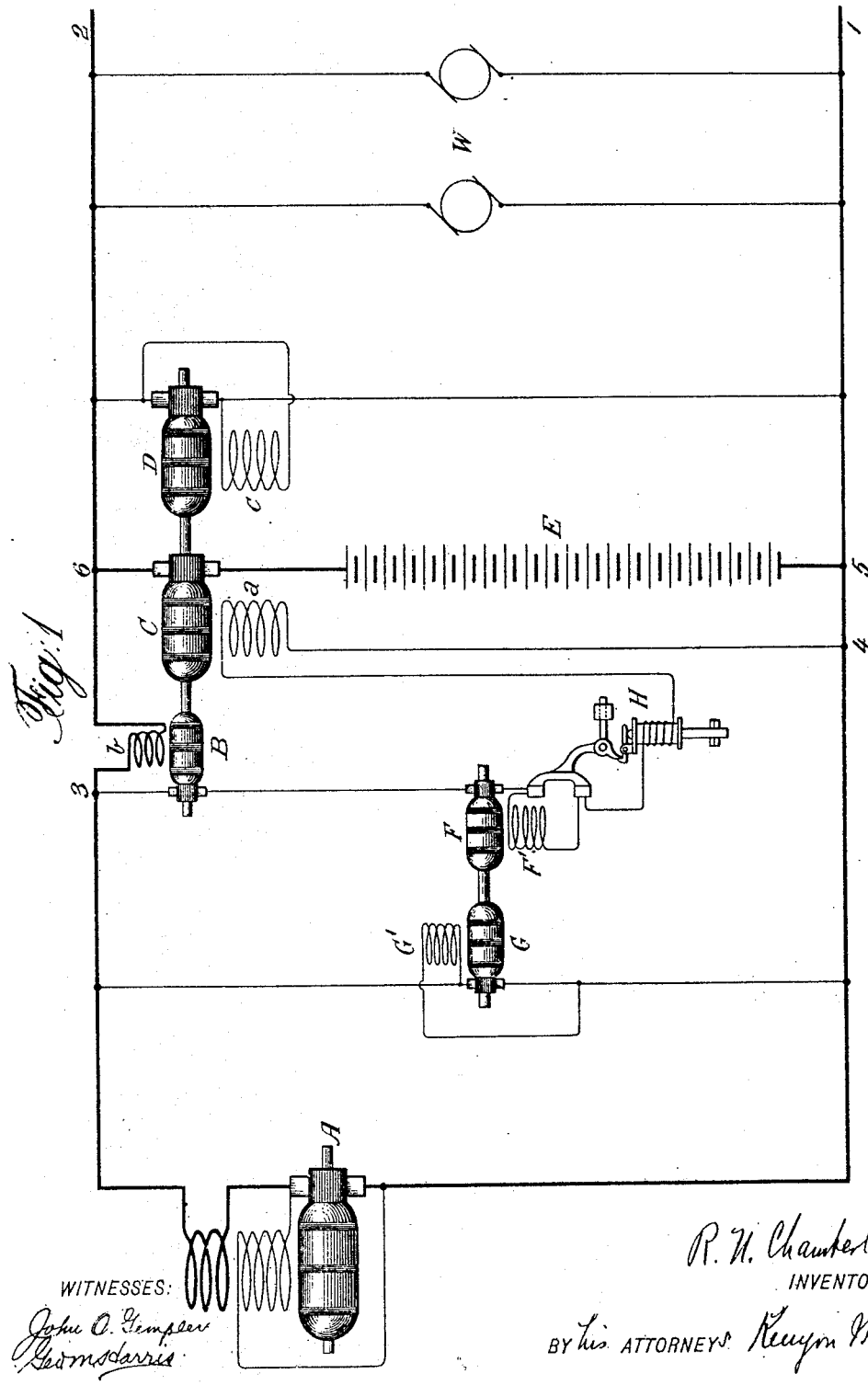

No. 882,872. PATENTED MAR. 24, 1908.
R. N. CHAMBERLAIN.
SYSTEM OF ELECTRICAL DISTRIBUTION.
APPLICATION FILED JAN. 17, 1906.
2 SHEETS—SHEET 2.
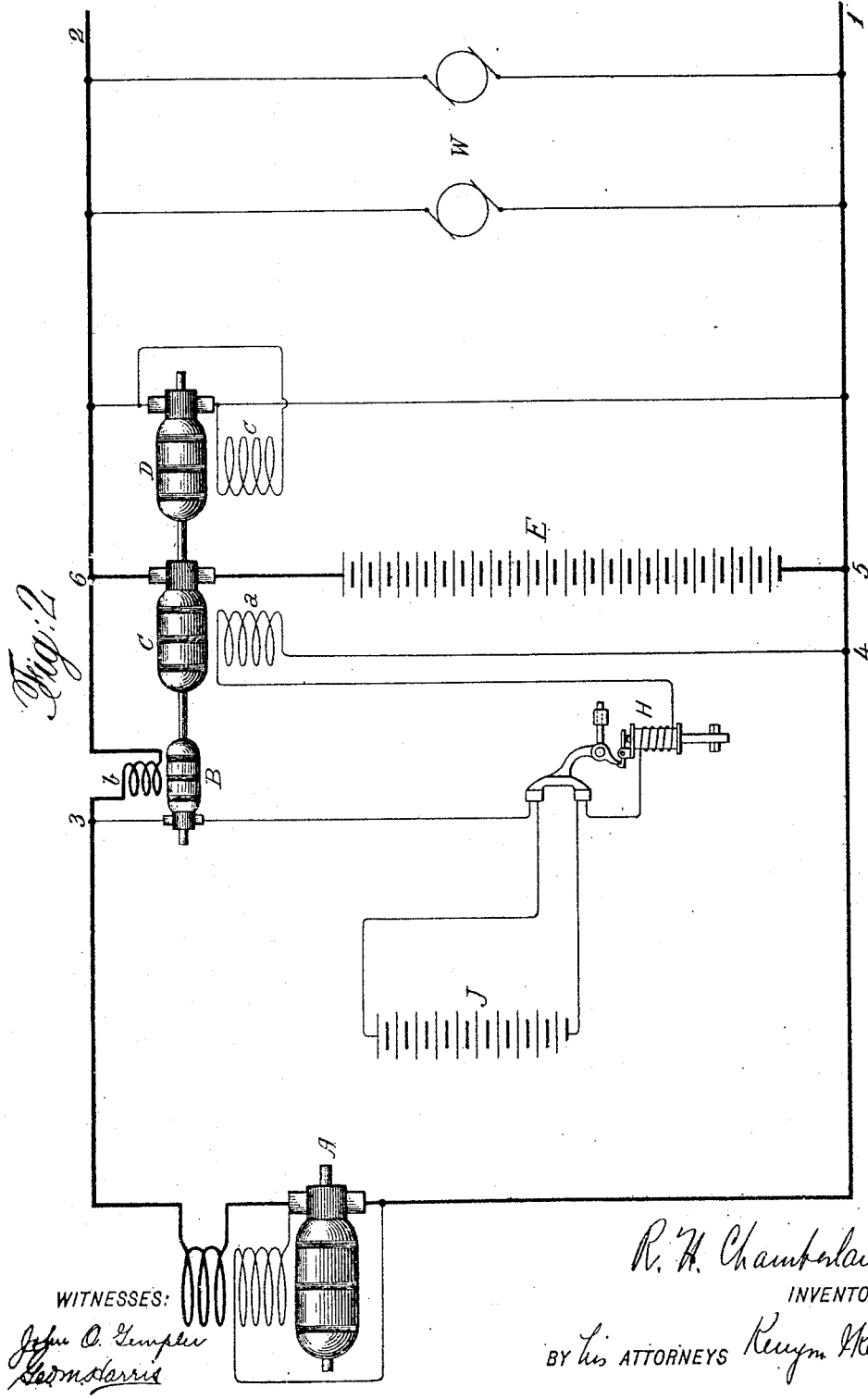

UNITED STATES PATENT OFFICE.

RUFUS N. CHAMBERLAIN, OF DEPEW, NEW YORK, ASSIGNOR TO GOULD STORAGE BATTERY COMPANY, A CORPORATION OF NEW YORK.

SYSTEM OF ELECTRICAL DISTRIBUTION.

No. 882,872.  Specification of Letters Patent.  Patented March 24, 1908.

Application filed January 17, 1906. Serial No. 296,622.

*To all whom it may concern:*

Be it known that I, RUFUS N. CHAMBERLAIN, a citizen of the United States, and a resident of Depew, in the county of Erie and State of New York, have invented certain new and useful Improvements in Systems of Electrical Distribution, of which the following is a specification.

My invention relates to improvements in systems of distribution and especially to that class of systems that employ a storage battery with a booster in series therewith, the two being connected in parallel with the main generating apparatus of the system or of a sub-station. In such systems it is usual to automatically regulate the electro-motive force generated by the booster in accordance with the varying needs of the system, and a very desirable way of producing this regulation has been to provide a branch circuit containing a winding that either directly or indirectly acts to regulate the booster electro-motive force in accordance with the current variations in said winding, and to produce such current variations by causing the branch circuit to be acted upon by the resultant of potential differences that act oppositely on said winding, one or both of the opposing potential differences being automatically regulatable. In this class of systems the best and most efficient regulation can be obtained when the maximum voltage, corresponding to the resultant of the opposing potential differences, is very much less than the components.

My invention is especially adapted to such a system, and has for its purpose the provision of apparatus that, while permitting the said winding to be designed for a relatively low voltage corresponding to what may be called the normal maximum of the resultant of the voltages acting upon it, will serve in an emergency when said opposing potential differences produce an abnormal resultant (as upon failure of one of said potential differences) to introduce another potential difference that will make the resultant approach more nearly to normal, preserving said winding undamaged as well as protecting all parts of the system from abnormal changes. To attain this object I provide a counter-electromotive force producing apparatus that will become active in the circuit of said controlling winding when an abnormal condition arises, but which is not active under normal conditions. Preferably I introduce this source of counter-electro-motive force in the circuit by causing an abnormal change to act upon an apparatus that is permanently in the branch circuit containing the controlling winding to cause it to produce the counter electro-motive force at the proper moment. I may, however, employ a device that is normally short circuited by part of the circuit containing the controlling winding, but which is no longer short circuited when abnormal conditions arise, and which is of such a nature as to produce a counter-electro-motive force dependent upon the amount of current flowing through it. Other specific methods of causing an abnormal potential difference to act upon the circuit of the controlling winding when abnormal conditions arise may be employed without departing from the scope of my invention.

The drawings accompanying this specification diagrammatically indicate arrangements embodying my invention.

Figure 1 indicates an arrangement which produces the abnormal potential difference magnetically, and Fig. 2 a modification in which the abnormal potential difference is created by the employment of what are known as counter-electro-motive cells.

In the drawings A indicates a main generator, here indicated as a compound wound dynamo. This may be the dynamo of a main central station or isolated plant, or it may be the generating end of transforming apparatus at a substation.

1 and 2 indicate the conductors of the working circuit containing the translating devices W. These conductors extend from points 5 and 6. The circuit of the generator A is connected at 5 and 6 to a battery circuit in which is the storage battery E and the booster armature C. This booster armature produces the electro-motive force which controls the current flowing in the battery circuit. Connected to the booster armature is a motor armature D having the shunt winding $c$.

In the present case the controlling winding for the booster is shown at $a$ as a field winding for the booster but it is not material to my invention whether the controlling winding acts upon the booster directly or indirectly. In any case this controlling winding $a$ is in a branch circuit. In the present case it is connected to the points 3 and 4 in the generator circuit. This branch circuit is therefore subjected to the voltage or potential difference of the generator circuit and this is, in the specific system shown, one of the opposing potential differences before referred to. The other potential difference is produced by the dynamo armature B, which is preferably connected mechanically with the booster armature C and motor armature D. The potential difference produced by the armature B is regulated by the field coil $b$ which being placed in the circuit of the main generator has a current variation corresponding to changes of load in that circuit. Preferably the apparatus will be so designed that the changes in current that shall be allowed to fall upon the coil $b$ will produce an electro-motive force in B that varies within small limits on each side of the normal voltage of the generator. Thus if the system is one having 500 volts across the generator circuit the apparatus may be so designed that the electro-motive force produced by B varies between 475 and 525. Under these circumstances the voltage across the coil $a$ will be the resultant of the generator electro-motive force of 500 and the varying electro-motive force of B, this resultant varying from 25 volts as a maximum in one direction to a like voltage as a maximum in the other direction. If, however, the circuit from generator A, for example, should open leaving the battery as the sole generating source, then current would no longer be passing through the primary regulating coil $b$ and the full voltage of the circuit would be active upon the controlling winding which would produce such a current flow as to destroy that winding. If an ordinary circuit breaker were placed in the circuit the booster would necessarily become inactive whenever the battery was relied upon as the sole source of electricity, but at this very time the booster is much needed in the system.

The description of the system illustrated has, so far, been the description only of systems now well known in the art. I have simply selected one of the known systems to which my invention is applicable.

To both protect the controlling winding and any apparatus in series with it and also protect the system as a whole and keep it in operation during abnormal periods, I introduce a potential difference at such abnormal times. In Fig. 1 this potential difference is created in the dynamo armature F. As shown, this armature is always in circuit but its field coil is short circuited by the circuit breaker H so that while that circuit breaker is closed F cannot produce electro-motive force. It is, however, revolving at sufficient speed, being driven by a motor G, G′, so that at the moment that the field coil F′ receives current and energizes its field magnet, a suitable counter-electro-motive force will be immediately produced by the armature F to restore substantially normal conditions in the controlling winding $a$. The field coil F′ is inserted in the circuit by the opening of the circuit breaker H, which in the present case is caused to open by any increase of current in its branch circuit. When F thus produces the protective counter-electro-motive force, the machine G becomes a generator returning energy to the system. I have shown the protective dynamo F as series wound. This I prefer because the amount of counter-electro-motive force it will produce will vary as the current in the controlling coil for the booster varies, thus giving at all times a counter-electro-motive force that is sufficient to satisfactorily limit the current flow.

In Fig. 2 the parts are all the same except that instead of the dynamos F and G with their coils F′ and G′ connected as shown, I have placed a set of batteries J connected to the circuit breaker to be introduced into the circuit when the circuit breaker is opened. This battery J is composed of cells of small capacity which are known in the art as counter-electro-motive force cells. They produce a counter-electro-motive force which varies in accordance with the current flowing through them so that the instant they are inserted in the circuit in which an abnormal current is already flowing a sufficient counter-electro-motive force is produced to restore the normal conditions in the winding $a$.

It will be noted that in both modifications of my invention, as herein illustrated, the counter-electro-motive force produced in the circuit of the booster field winding in order to protect it when the conditions of the system are abnormal is dependent in its amount upon the amount of current flowing in the circuit of the booster field winding. In the case of the production magnetically of the counter-electro-motive-force the value of that electro-motive-force will depend upon the current flowing through the field F′, this being the same current that flows through the booster field $a$. In the case of the counter-electro-motive-force cells J the amount of the electro-motive-force produced by those cells is dependent upon the current flowing through them, and this again is the current of the booster field winding. Therefore, in both arrangements I am enabled to produce a counter-electro-motive-force that will protect the circuit whatever the cause of derangement of the system may be or however violent it may be. It should also be noted that in each modification the electro-motive-force produced in the circuit of the booster field winding is counter to the voltage that tends to send an abnormal current through the circuit. In the case of the dynamo of Fig. 1 the polarity of the armature F will depend upon the direction of the current flow, since the rotation of the armature is always in the same direction. The same result is obviously attained by the use of the counter cells of Fig. 2. Therefore, by my invention I am enabled to effectually protect the booster field winding while allowing the booster to operate whatever be the cause of disturbance, and however great the current that that disturbance may tend to produce in the booster field winding.

While I have shown only two specific embodiments of my invention it will be understood that the specific apparatus employed may be largely modified without departing from my invention, as set forth in the appended claims.

Having thus described my invention, what I claim as new and desire to secure by Letters Patent, is:

1. The combination of a main generator, battery and booster of a coil for controlling the booster E. M. F. energized by the resultant of opposing potential differences, and means for applying another potential difference to said coil operated by changes of electrical condition in the circuit containing said coil.

2. The combination of a main generator, battery and booster of a coil for controlling the booster E. M. F., and means actuated by changes of electrical condition in the circuit containing said winding due to increases of the voltage acting upon said coil, for applying to the coil a potential difference opposing said voltage.

3. The combination of a main generator, battery and booster of a coil for controlling the booster E. M. F., means for applying to said coil a varying voltage, and apparatus acted upon by increase of current in the circuit of said coil to generate a protective counter E. M. F. in said circuit.

4. The combination of a main generator, battery and booster of a coil for controlling the booster E. M. F., means for applying the resultant of opposing potential differences to said coil, one of said potential differences being substantially constant and the other varying with the current strength of the main generator circuit, and devices acted upon by the electrical condition of the circuit of said coil to insert therein a protective counter electro-motive force.

5. The combination of a main generator, battery and booster of a coil for controlling the booster E. M. F., means for applying a varying voltage to said coil, and means, dependent upon increase of said voltage, for causing the current traversing the circuit of said coil to cause a counter E. M. F. in said circuit.

6. The combination of a main generator, battery and booster of a coil for controlling the booster E. M. F., means for applying a varying voltage to said coil, a dynamo, and means, dependent upon increase of said voltage, for causing said dynamo to generate counter E. M. F in said circuit.

7. The combination of a main generator, battery and booster of a coil for controlling the booster E. M. F., means for applying to said coil the resultant of opposing potential differences, a dynamo, and means actuated by changes of electrical condition in the circuit of said coil, for causing said dynamo to generate counter E. M. F. in said circuit.

8. The combination of a main generator, battery and booster of a coil for controlling the booster E. M. F., means for applying the resultant of opposing potential differences to said coil, one of said potential differences being substantially constant and the other varying with the current strength of the main generator circuit, a dynamo, and means actuated by changes of electrical condition in the circuit of said coil for causing said dynamo to generate a counter E. M. F. in said circuit.

9. The combination of a main generator, battery and booster of a coil for controlling the booster E. M. F., means for applying the resultant of opposing potential differences to said coil, one of said potential differences being substantially constant and the other varying with the current strength of the main generator circuit, a dynamo whose armature is in circuit with said coil, a normally inactive field coil for said dynamo, and means actuated by changes of electrical condition in the circuit of said coil, for rendering said dynamo field-coil active.

10. The combination of a main generator, battery and booster of a coil for controlling the booster E. M. F., means for applying the resultant of opposing potential differences to said coil, one of said potential differences being substantially constant and the other varying with the current strength of the main generator circuit, a series wound dynamo in the circuit of said coil, and an automatic circuit-breaker normally short-circuiting the field-winding of said dynamo.

11. The combination of a main generator, battery and booster of a coil for controlling the booster E. M. F., means for applying the resultant of opposing potential differences to said coil, one of said potential differences being substantially constant and the other varying with the current strength of the main generator circuit, a series wound dynamo in the circuit of said coil, an automatic circuit-breaker normally short-circuiting the field-winding of said dynamo, and a coil for opening said circuit-breaker located in the said circuit.

In testimony whereof, I have signed my name to this specification, in the presence of two subscribing witnesses.

RUFUS N. CHAMBERLAIN.

Witnesses:
FRANK BENTIN,
ANNA L. KENNEDY.